Jan. 24, 1950 G. W. GIBBS 2,495,518
FRICTIONAL REVERSIBLE TRANSMISSION MECHANISM
Filed Sept. 28, 1948 2 Sheets-Sheet 1
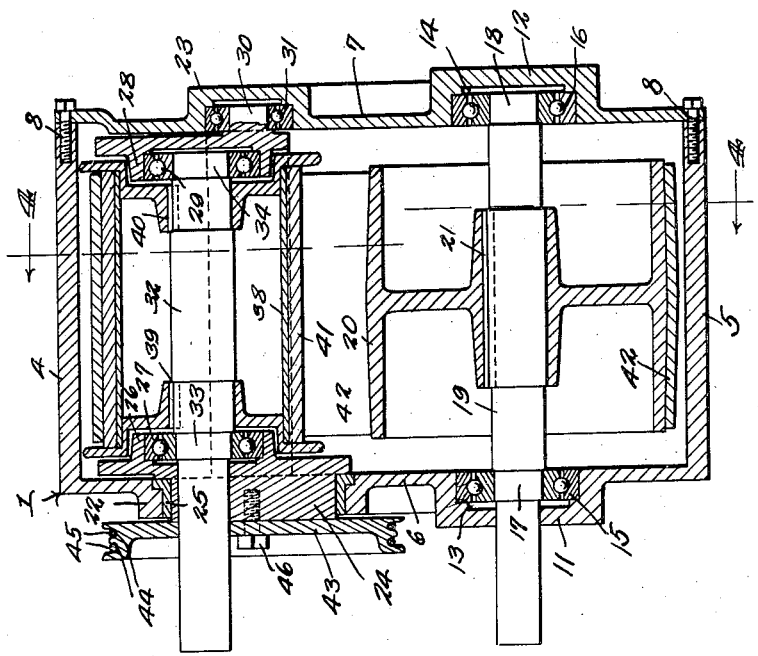
G. W. Gibbs
INVENTOR
BY
ATTORNEYS.

Jan. 24, 1950   G. W. GIBBS   2,495,518
FRICTIONAL REVERSIBLE TRANSMISSION MECHANISM
Filed Sept. 28, 1948   2 Sheets-Sheet 2

G. W. Gibbs
INVENTOR

BY C. A. Snow & Co.
ATTORNEYS

Patented Jan. 24, 1950

2,495,518

UNITED STATES PATENT OFFICE 2,495,518

FRICTIONAL REVERSIBLE TRANSMISSION MECHANISM

George W. Gibbs, Jacksonville, Fla.

Application September 28, 1948, Serial No. 51,583

5 Claims. (Cl. 74—218)

This invention relates to improvements in frictional reversible transmission mechanism.

An object of the invention is to provide an improved frictional reversible transmission mechanism which will employ a driving and a driven pulley connected together by a belt for driving a mechanism in a forward direction, and said belt being slacked off and the driving pulley being moved to positively engage the driven pulley to drive the same in a reverse direction for driving the mechanism in a reverse direction.

Another object of the invention is to provide an improved frictional reversible transmission mechanism having an eccentrically mounted rotatable pulley and a fixed rotatable pulley connected together by a belt, said transmission driving in one direction when the belt is tight upon the pulleys, and said transmission driving in a reverse direction when the eccentrically mounted rotatable pulley is moved to slack off the belt so that the pulleys will positively engage each other.

A further object of the invention is to provide an improved frictional reversible transmission mechanism which will be highly efficient in operation, and relatively inexpensive to manufacture and produce.

Other objects will appear as the description proceeds.

In the accompanying drawings which form a part of this application:

Figure 1 is a front elevation of the improved frictional reversible transmission mechanism;

Fig. 2 is a sectional view taken on the line 2—2 of Fig. 1;

Like characters of reference are used throughout the following specification and the accompanying drawings to designate corresponding parts.

Figure 3:
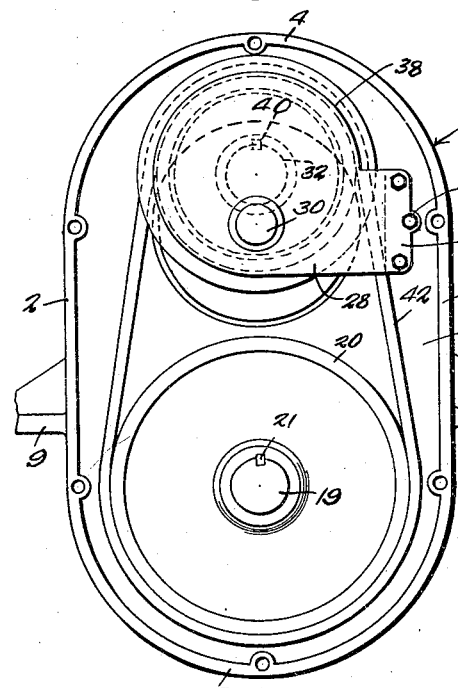
Fig. 3 is a front elevation of the improved frictional reversible transmission mechanism with the front cover plate removed.
Figure 4:
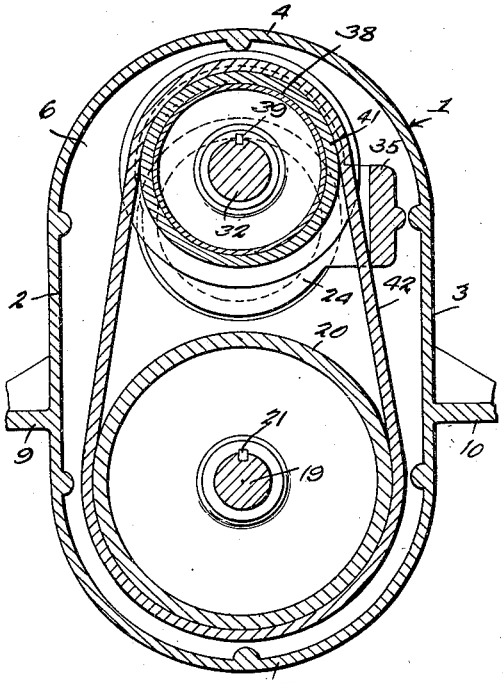
Fig. 4 is a sectional view taken on the line 4—4 of Fig. 2.
Figure 5:
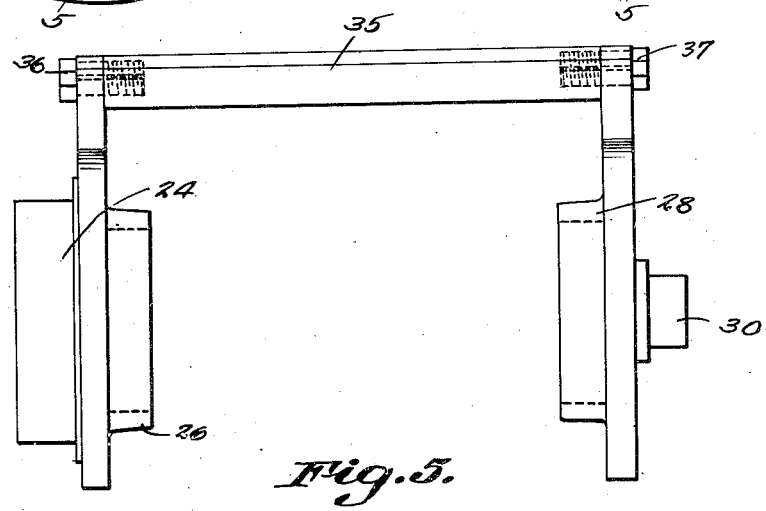
Fig. 5 is a front elevation of the eccentric yoke bearings for the driving shaft and drive pulley.

In carrying out the invention, there is provided a transmission casing or housing 1 of integral construction, having parallel side walls 2 and 3 which are disposed in a vertical plane, rounded semi-circular upper and lower ends 4 and 5, and an end wall 6. A removable cover plate 7 forms the opposite end wall and is adapted to be secured upon the casing or housing 1 by means of the screw bolts 8.

Oppositely disposed laterally extending supporting webs or flanges 9 and 10 are formed on the opposite side walls 2 and 3 for mounting the transmission casing or housing 1 in the desired position.

Oppositely disposed outwardly extending bosses 11 and 12 are formed respectively on the lower end portions of the casing or housing end 6 and upon the cover plate 7, being recessed at 13 and 14 to receive and support the ball bearing races 15 and 16 in which the reduced ends 17 and 18 of the driven shaft 19 are mounted for rotation. The end 17 of the shaft 19 extends through and beyond the casing or housing end 6 for connection with a propeller shaft (not shown) or other desired mechanism which is to be driven.

A large pulley 20 will be secured to the driven shaft 19 by means of a key 21 and will be housed in the lower end of the casing or housing 1.

Transversely disaligned large and small bosses 22 and 23 respectively are formed on the upper end portions of the casing or housing end 6 and upon the upper end of the cover plate 7. An eccentric 24 is rotatably supported in a bushing 25 in the large boss 22 and is provided with the integral bearing supporting sleeve 26 in which the ball bearing race 27 is disposed. A cooperating bearing supporting sleeve 28 is disposed adjacent the inner surface of the cover plate 7 and supports the ball bearing race 29. A stub bearing shaft 30 is formed integrally with the bearing supporting sleeve 28 and extends laterally and eccentrically thereof, being supported in the ball bearing race 31 received in the small boss 23 in the cover plate 7.

A drive shaft 32 having reduced ends 33 and 34 mounted for rotation in the ball bearing races 27 and 29 is provided, the end 33 extending beyond the casing or housing 1 and being adapted for connection with a prime mover (not shown) for driving the transmission mechanism contained in the casing or housing 1. A yoke connecting bar 35 extends transversely between the eccentric 24 and the oppositely disposed bearing supporting sleeve 28, and is attached to said parts by means of the screw bolts 36 and 37.

A pulley 38 of smaller size than the pulley 20 is disposed upon the drive shaft 32 being held firmly in place by the keys 39 and 40, and is formed with a rubber bearing surface 41 about it. A belt 42 is disposed about the pulleys 38 and 20 for driving the pulley 20 and driven shaft 19 when the belt 42 is taut.

A control sheave 43 having peripheral grooves 44 for supporting the control cable 45 which may be remotely operated, is provided, and is adapted to be secured to the outer surface of the eccentric 24 by means of the bolts 46. Rotation of the control sheave 43 will control and affect the tightness of the belt 42 connecting the pulleys 38 and 20, whereby the mechanism being driven (not shown) will operate in a forwardly direction. However, further rotation of the control sheave 43 will cause the eccentric 24 and sleeve 28 to move inwardly or downwardly until the rubber coated pulley 38 positively engages the pulley 20 to drive it and the mechanism being driven (not shown) in a reverse direction, it being understood that the belt 42 will then be slack.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A frictional reversible transmission mechanism including a one-piece casing and a cover plate detachably secured thereon, opposed laterally extending bosses on the lower portions of said casing and cover, ball bearing races supported in said bosses, a driven shaft rotatably mounted in said ball bearing races and having one end extending through and beyond said casing, a driven pulley fixed to said shaft, opposed laterally extending disaligned bosses on the upper portion of said casing and cover, an eccentric mounted in one of said bosses, a bearing support having an eccentrically disposed stub bearing shaft formed thereon mounted in the other disaligned boss, ball bearing races in said eccentric and bearing support, a driving shaft rotatably supported in said ball bearing races, a pulley fixed to said shaft, a yoke connected between said eccentric and bearing support, a belt connected between said pulleys for driving the driven pulley in one direction when said belt is taut and said driving pulley is rotated, and said driving pulley positively engaging said driven pulley when said eccentric is rotated and said belt is slack for operating the driven pulley in a reverse direction.

2. A frictional reversible transmission mechanism including a one-piece casing and a cover plate detachably secured thereon, opposed laterally extending bosses on the lower portions of said casing and cover, ball bearing races supported in said bosses, a driven shaft rotatably mounted in said ball bearing races and having one end extending through and beyond said casing, a driven pulley fixed to said shaft, opposed laterally extending disaligned bosses on the upper portion of said casing and cover, an eccentric mounted in one of said bosses, a bearing support having an eccentrically disposed stub bearing shaft formed thereon mounted in the other disaligned boss, ball bearing races in said eccentric and bearing support, a driving shaft rotatably supported in said ball bearing races, a pulley fixed to said shaft, a yoke connected between said eccentric and bearing support, a belt connected between said pulleys for driving the driven pulley in one direction when said belt is taut and said driving pulley is rotated, said driving pulley positively engaging said driven pulley when said eccentric is rotated and said belt is slack for operating the driven pulley in a reverse direction, and a rubber friction surface applied about said driving pulley between the same and said belt.

3. A frictional reversible transmission mechanism including a one-piece casing and a cover plate detachably secured thereon, opposed laterally extending bosses on the lower portions of said casing and cover, ball bearing races supported in said bosses, a driven shaft rotatably mounted in said ball bearing races and having one end extending through and beyond said casing, a driven pulley fixed to said shaft, opposed laterally extending disaligned bosses on the upper portion of said casing and cover, an eccentric mounted in one of said bosses, a bearing support having an eccentrically disposed stub bearing shaft formed thereon mounted in the other disaligned boss, ball bearing races in said eccentric and bearing support, a driving shaft rotatably supported in said ball bearing races, a pulley fixed to said shaft, a yoke connected between said eccentric and bearing support, a belt connected between said pulleys for driving the driven pulley in one direction when said belt is taut and said driving pulley is rotated, said driving pulley positively engaging said driven pulley when said eccentric is rotated and said belt is slack for operating the driven pulley in a reverse direction, a rubber friction surface applied about said driving pulley between the same and said belt, and an eccentric operating sheave secured to the outer end of said eccentric.

4. A frictional reversible transmission mechanism including a one-piece casing and a cover plate detachably secured thereon, opposed laterally extending bosses on the lower portions of said casing and cover, ball bearing races supported in said bosses, a driven shaft rotatably mounted in said ball bearing races and having one end extending through and beyond said casing, a driven pulley fixed to said shaft, opposed laterally extending disaligned bosses on the upper portion of said casing and cover, an eccentric mounted in one of said bosses, a bearing support having an eccentrically disposed stub bearing shaft formed thereon mounted in the other disaligned boss, ball bearing races in said eccentric and bearing support, a driving shaft rotatably supported in said ball bearing races, a pulley fixed to said shaft, a yoke connected between said eccentric and bearing support, a belt connected between said pulleys for driving the driven pulley in one direction when said belt is taut and said driving pulley is rotated, said driving pulley positively engaging said driven pulley when said eccentric is rotated and said belt is slack for operating the driven pulley in a reverse direction, a rubber friction surface applied about said driving pulley between the same and said belt, an eccentric operating sheave secured to the outer end of said eccentric being formed with peripheral grooves thereabout, and a cable disposed about said sheave disposed in said peripheral grooves for remotely actuating said eccentric to control said transmission mechanism.

5. The subject matter as claimed in claim 1, and oppositely extending casing supporting and mounting webs formed integrally with said casing.

GEORGE W. GIBBS.

No references cited.